US012677065B2

(12) United States Patent
Li et al.

(10) Patent No.: US 12,677,065 B2
(45) Date of Patent: Jul. 7, 2026

(54) TIME CODE GENERATION CIRCUIT, TIME CODER, AND SIGNAL GENERATION METHOD OF TIME CODER

(71) Applicant: Aputure Imaging Industries Co., Ltd., Shenzhen (CN)

(72) Inventors: Lu Li, Shenzhen (CN); Yi Xie, Shenzhen (CN); Xiangjun Zhou, Shenzhen (CN)

(73) Assignee: Aputure Imaging Industries Co., Ltd., Shenzhen (CN)

( * ) Notice: Subject to any disclaimer, the term of this patent is extended or adjusted under 35 U.S.C. 154(b) by 223 days.

(21) Appl. No.: 18/396,484

(22) Filed: Dec. 26, 2023

(65) Prior Publication Data

US 2024/0129627 A1      Apr. 18, 2024

Related U.S. Application Data

(63) Continuation of application No. PCT/CN2022/134198, filed on Nov. 24, 2022.

(30) Foreign Application Priority Data

Mar. 28, 2022      (CN) .......................... 202210310865.2

(51) Int. Cl.
| | |
|---|---|
| *H04N 23/667* | (2023.01) |
| *G03B 31/00* | (2021.01) |
| *G11B 27/10* | (2006.01) |

(52) U.S. Cl.
CPC ........... *H04N 23/667* (2023.01); *G03B 31/00* (2013.01); *G11B 27/10* (2013.01)

(58) Field of Classification Search
CPC ....... H04N 23/667; G03B 31/00; G11B 27/10
See application file for complete search history.

(56) References Cited

U.S. PATENT DOCUMENTS

| | | | | |
|---|---|---|---|---|
| 2018/0162555 A1* | 6/2018 | Lin | ........................ | B64D 45/00 |
| 2022/0365742 A1* | 11/2022 | Liu | ......................... | G06F 3/165 |

FOREIGN PATENT DOCUMENTS

| | | |
|---|---|---|
| CN | 101556798 A | 10/2009 |
| CN | 104270219 A | 1/2015 |

(Continued)

OTHER PUBLICATIONS

International Search Report in International application No. PCT/CN2022/134198mailed on Jan. 19, 2023.

(Continued)

*Primary Examiner* — Yassin Alata

(74) *Attorney, Agent, or Firm* — PV IP PC; Wei Te Chung

(57) ABSTRACT

A time code generation circuit includes: a port; a time code switching module connected to the port; an amplitude adjustment module connected to the time code switching module; and a main control module respectively connected to the time code switching module and the amplitude adjustment module. The amplitude adjustment module is configured to receive a time code signal generated by the main control module and perform amplitude adjustment to generate time code signals with different amplitudes. The time code switching module is configured to receive a time code signal undergone amplitude adjustment. The main control module is configured to receive first operation input to generate a time code signal and configure the time code signal to be input into the amplitude adjustment module for amplitude adjustment. The time code signal undergone amplitude adjustment is transmitted into the port through the time code switching module.

20 Claims, 9 Drawing Sheets

(56)         References Cited

FOREIGN PATENT DOCUMENTS

| CN | 112433466 A | 3/2021 |
| CN | 112988109 A | 6/2021 |
| CN | 114422709 A | 4/2022 |
| JP | 2018201096 A | 12/2018 |

OTHER PUBLICATIONS

Written Opinion of the International Search Authority in International application No. PCT/CN2022/134198mailed on Jan. 19, 2023.

* cited by examiner

TIME CODE GENERATION CIRCUIT, TIME CODER, AND SIGNAL GENERATION METHOD OF TIME CODER

CROSS-REFERENCE TO RELATED APPLICATIONS

This application is a continuation of International Application No. PCT/CN2022/134198, filed on Nov. 24, 2022, which claims priority to Chinese Patent Application No. 202210310865.2 filed on Mar. 28, 2022. The disclosures of the aforementioned applications are incorporated herein by reference in their entireties.

TECHNICAL FIELD

The present invention relates to the field of time code synchronization technologies, and in particular, to a time code generation circuit, a time coder, and a signal generation method of the time coder.

BACKGROUND

Time code is time code that accurately marks video frames during photography. The time code works by calculating an exact quantity of frames from the first to the last frame of a video. When the frames are counted, a unique identifier is allocated to each frame by using the time code. Each frame has a label that includes a value of hour: minute: second: frame. Generally, a photography process usually involves a plurality of microphones, cameras, video cameras, or the like.

In the foregoing scenario, for example, a microphone or a camera device usually does not have a time code function. Therefore, a time code signal is output by an extra time coder. The time code signal may be input into devices, such as a camera device and a mixing desk, to achieve time code synchronization between devices, so as to better clip videos, audios, or the like. However, when a photographing scene changes, transmission of audio signals is generally required. A time code device and an audio device are usually two independent devices. A time code signal and an audio signal cannot coexist in a same port. When the time code signal and the audio signal are transmitted using a same transmission line, a value of the time code signal is always fixed. The time code signal and the audio signal are usually close in a circuit, resulting in a difficulty in accurately distinguishing the two signals as well as mutual interference. Consequently, function accuracy of a product is reduced and user's usage efficiency is lowered.

SUMMARY

According to a first aspect, an embodiment of the present invention provides a time code generation circuit. The time code generation circuit includes: a port; a time code switching module, wherein the time code switching module is connected to the port; an amplitude adjustment module, wherein the amplitude adjustment module is connected to the time code switching module; and a main control module, wherein the main control module is respectively connected to the time code switching module and the amplitude adjustment module. The amplitude adjustment module is configured to receive a time code signal generated by the main control module and perform amplitude adjustment to generate time code signals with different amplitudes. The time code switching module is configured to receive a time code signal undergone amplitude adjustment. The main control module is configured to receive first operation input to generate a time code signal and configure the time code signal to be input into the amplitude adjustment module for amplitude adjustment. The time code signal undergone amplitude adjustment is transmitted into the port through the time code switching module.

According to a second aspect, an embodiment of the present invention further provides a time coder. The time coder includes a housing and the time code generation circuit described in any of the foregoing implementations.

According to a third aspect, an embodiment of the present invention further provides a signal generation method of a time coder. The time coder includes the time code generation circuit described above. The method includes: turning on a power switch of the main control module; receiving first operation input, wherein the main control module generates a time code signal based on the first operation input and inputs the time code signal into the amplitude adjustment module for amplitude adjustment, and the time code signal undergone amplitude adjustment is transmitted into the port through the time code switching module; receiving second operation input, wherein the main control module controls transmission of the audio signal of the audio acquisition module into the port based on the second operation input; and receiving third operation input, wherein the main control module configures the port based on the third operation input to receive an external time code signal, and the external time code signal is input from the time code switching module into the main control module.

BRIEF DESCRIPTION OF THE DRAWINGS

To describe technical solutions in embodiments of the present invention more clearly, the following briefly describes the accompanying drawings required for describing the embodiments. It is clearly that the accompanying drawings in the following description show some embodiments of the present invention, and a person of ordinary skilled in the art may still derive other drawings from these accompanying drawings without creative efforts.

DETAILED DESCRIPTION

Figures 1, 2:
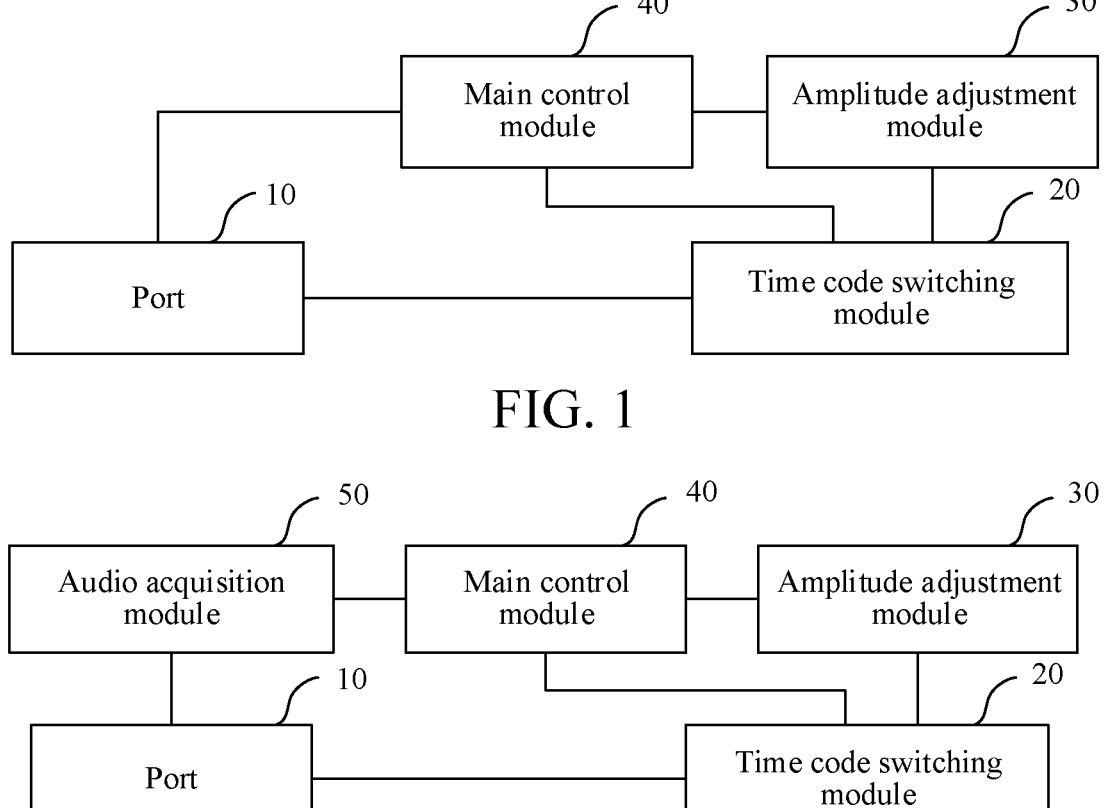
FIG. 1 is a simple schematic diagram of an embodiment of a time code generation circuit according to an embodiment of the present invention.
FIG. 2 is a simple schematic diagram of another embodiment of a time code generation circuit according to an embodiment of the present invention.

The following clearly and completely describes the technical solutions in the embodiments of the present invention with reference to the accompanying drawings in the embodiments of the present invention. Clearly, the embodiments are some of the embodiments of the present invention rather than all of the embodiments. All other embodiments obtained by a person of ordinary skill in the art according to the disclosed embodiments without creative efforts shall fall within the protection scope of the present invention.

It should be understood that when used in the present specification and the appended claims, the terms "include" and "comprise" indicate the presence of the described features, integers, steps, operations, elements and/or components, but do not exclude the presence or addition of one or more other features, integers, steps, operations, elements, components and/or collections thereof It should be also understood that terms used in the specification of the present invention are merely intended to describe an objective of a specific embodiment, and are not intended to limit the present invention. As used in the specification of the present invention and the appended claims, the terms "a", "one" and "the" in singular forms are intended to include plural forms, unless otherwise specified in the context clearly.

It should also be further understood that the term "and/or" as used in the specification of the present invention and the appended claims refers to and includes any combination of one or more of the associated listed terms and all possible combinations.

An embodiment of the present invention provides a time code generation circuit and a time coder. Detailed descriptions are separately provided below.

The time code generation circuit provided in an embodiment of the present invention may include: a port 10; a time code switching module 20, wherein the time code switching module 20 is connected to the port 10; an amplitude adjustment module 30, wherein the amplitude adjustment module 30 is connected to the time code switching module 20; and a main control module 40, wherein the main control module 40 is separately connected to the time code switching module 20 and the amplitude adjustment module 30. The amplitude adjustment module 30 is configured to receive a time code signal generated by the main control module 30 and perform amplitude adjustment to generate time code signals with different amplitudes. For example, an amplitude can be increased, to generate a time code signal whose amplitude is greater than an original amplitude. Alternatively, the amplitude of the time code signal can be reduced. The time code switching module is configured to receive a time code signal undergone amplitude adjustment.

It can be understood that the main control module 40 can be configured to control corresponding work of another module. The main control module is further configured to generate a time code signal. The amplitude adjustment module can be configured to receive a time code signal generated by the main control module 40 and perform amplitude adjustment on the time code signal. An amplitude of a time code signal after adjustment is different from an amplitude of a time code signal directly generated by the main control module 40. The amplitude adjustment module 30 can send the time code signal undergone amplitude adjustment to the time code switching module. The time code switching module 20 is configured to switch input and/or output of the time code signal. For example, the time code switching module 20 can receive the time code signal adjusted by the amplitude adjustment module and output the time code signal to the port 10. The time code switching module 20 is further configured to receive an external time code signal (which is not generated by the main control module 40 of the time code device) and transmit the external time code signal into the main control module 40, to achieve synchronization of the external time code signal and the time code signal of the main control module 40.

The main control module 40 is configured to receive first operation input. The first operation input may be operation input from a user (such as operating a mechanical physical switch or operating an interactive interface through a touch screen) or automatic machine recognition, or may be operation input, such as voice, gesture, or image recognition. It may be understood that operation input may include input/output of a time code signal, output of a time code signal and an audio signal, output of an audio signal, or the like. For example, a corresponding menu bar of a display screen includes a corresponding option. A user can enter a corresponding work (signal input/output) mode after selecting and determining a corresponding option. To be specific, the main control module 40 obtains different operation inputs from the user, so that the port is in different signal output modes. For example, the first operation input may include a time code signal output mode. In this case, the time code signal output mode may only be a time code signal output mode, a time code signal and audio signal output mode, or the like. It can be understood that if the port 10 is in the time code signal output mode or the time code signal and audio signal output mode, the main control module 40 may generate a time code signal and configure the time code signal to be input into the amplitude adjustment module 30 for amplitude adjustment. A time code signal undergone amplitude adjustment is transmitted to the port 10 through the time code switching module 20.

In some embodiments, the main control module 40 may further receive second operation input, third operation input, or the like. Input operations are different, such as different key options or corresponding different menu bar. It can be understood that the main control module 40 is configured to receive the third operation input to configure the port 10 to receive an external time code signal. The external time code signal is input from the time code switching module 20 to the main control module 40. To be specific, if the port 10 is in the time code signal input mode, the time code signal is transmitted through the port 10 into the time code switching module 20, and is transmitted through the time code switching module 20 into the main control module 40. It can be understood that only one port 10 is provided in the circuit, a time code switching module 20 is provided between the main control module 40 and the port 10, and the main control module 40 controls the time code switching module 20 to be turned on, so that the external time code signal may be input into the main control module 40 through the port 10. In addition, an amplitude adjustment module 30 is provided between the main control module 40 and the time code switching module 20, so that the time code signal undergone amplitude adjustment can be output at the port 10. This resolves the technical problem that a time code signal output at the port 10 interferes with the audio signal, and greatly improves user's usage efficiency.

FIG. 1 is a simple schematic diagram of an embodiment of a time code generation circuit according to an embodiment of the present invention. In FIG. 1, the port 10 may be not only in the time code signal output mode, but also in the time code signal and audio signal output mode, or in a time code signal input mode, or in an audio signal output mode. The audio signal may be acquired by the audio acquisition module and input through the port 10 into an audio device connected to the port 10. The time code signal may also be input through the port 10 into another device that can recognize the time code signal. In addition, the external time code signal may also be input through the port 10 from the time code switching module 20 into the main control module 40. In addition, when the port 10 only outputs the time code signal, the time code signal can be time code after amplitude adjustment. When the port 10 outputs both the time code signal and the audio signal, the time code signal may be a time code signal undergone amplitude adjustment, thereby reducing interference of the time code signal on the audio signal.

The main control module 40 can be an MCU (micro-controller unit) chip. The main control module 40 is electrically connected to another module through a plurality of pins with different functions. Specifically, an end of the time code switching module 20 is electrically connected to a pin in the main control module 40, to cause an externally generated time code signal to be input from the time code switching module 20 into the main control module 40. In addition, the main control module 40 may also generate a time code signal and input the time code signal into the amplitude adjustment module 30 for amplitude adjustment. The amplitude adjustment module 30 is electrically connected to a plurality of pins of the main control module 40, to cause the main control module 40 to transmit the generated time code signal into the amplitude adjustment module 30. The main control module 40 controls the amplitude adjustment module 30 to perform amplitude adjustment on the time code signal. After the amplitude adjustment module 30 inputs a time code signal undergone amplitude adjustment into the time code switching module 20, the main control module 40 controls the time code switching module 20, to output the time code signal undergone amplitude adjustment to the port 10.

In an embodiment, as shown in FIG. 2, the time code generation circuit further includes an audio acquisition module 50. The audio acquisition module 50 is separately connected to the port 10 and the main control module 40. Specifically, an end of the audio acquisition module 50 is electrically connected to a pin of the main control module 40. After the audio acquisition module 50 acquires an audio signal, the main control module 40 is configured to receive the second operation input to generate a corresponding drive signal, and control the audio acquisition module 50 using the pin to directly input the audio signal to the port 10. In the present embodiment, pins for electrical connection between the main control module 40 and the amplitude adjustment module 30, the time code switching module 20, and the audio acquisition module 50 are different.

Figure 3:
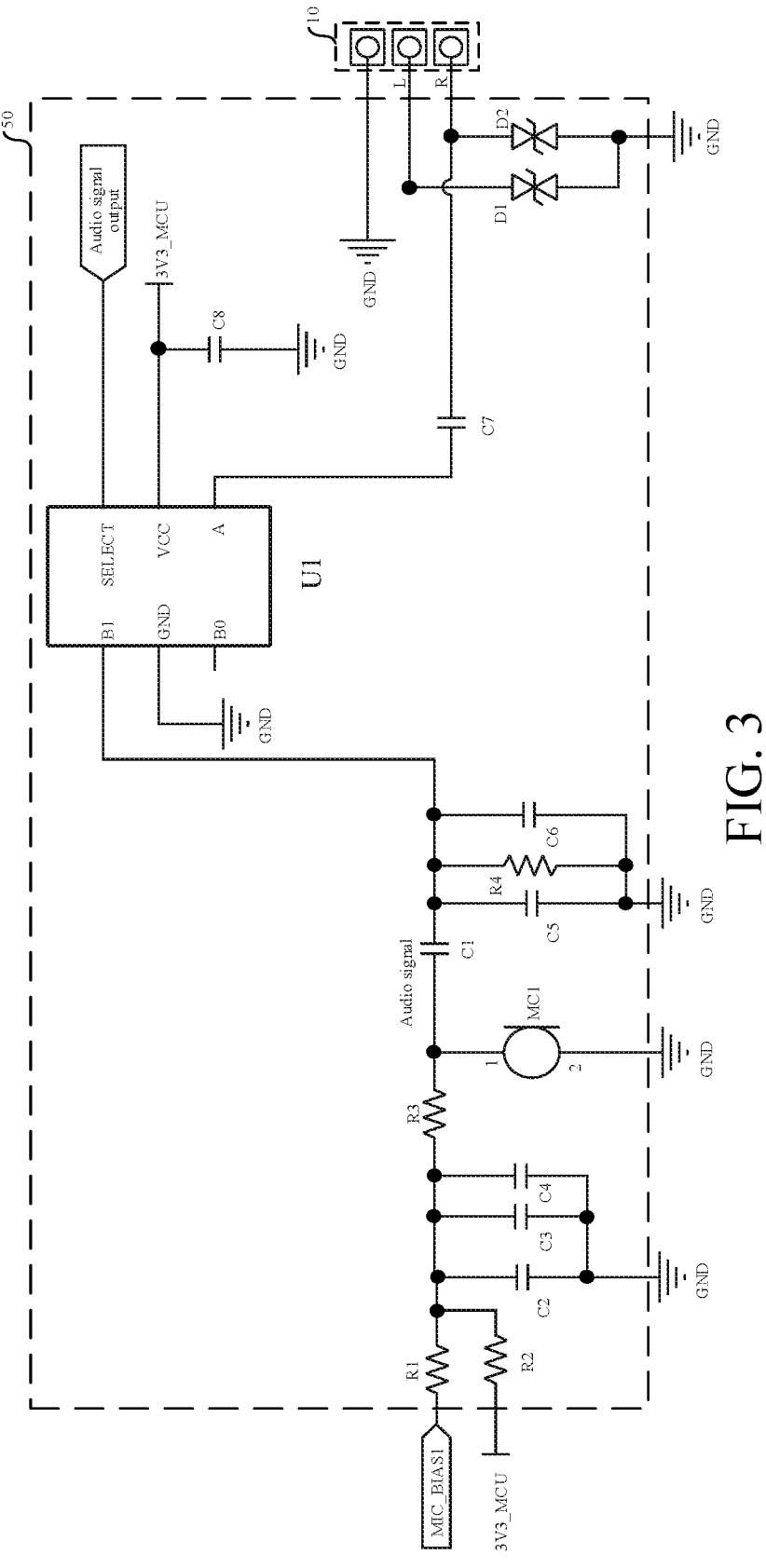
FIG. 3 is a schematic diagram of an embodiment in which an audio acquisition module is electrically connected to a port according to an embodiment of the present invention.

FIG. 3 is a schematic diagram of an embodiment in which an audio acquisition module is electrically connected to a port according to an embodiment of the present invention. As shown in FIG. 3, the audio acquisition module 50 includes a microphone MC1 (microphone 1, microphone 1) and a first switch U1. One end of the microphone MC1 (or microphone) is separately connected to the main control module 40 and the first switch U1, and the other end is grounded. The first switch U1 is separately connected to the main control module 40 and the port 10. In the present embodiment, the microphone MC1 is configured to convert acquired sound into an audio electronic signal, and the main control module 40 inputs the audio electronic signal into the port 10 by controlling the first switch U1.

It should be noted that, the microphone MC1 used in the present invention may be a carbon microphone, an electro-magnetic type microphone, a condenser type microphone, an electret capacitor type microphone, a piezoelectric crystal type microphone, a piezoelectric ceramic type microphone, a silicon dioxide type microphone, or the like. The first switch U1 and the second switch U2 used in the present invention may be analog switches, or may be switches that are controlled by the main control module 40 to be turned on. The port 10 may be any of a TRRS (Tip-Ring-Ring-Sleeve, tip-ring-ring-sleeve) port, a Type-C (USB-C, Type-C Universal Serial Bus) port, or a USB (Universal Serial Bus) port, which may be selected according to an actual situation and is not specified in the present embodiment.

In the embodiment shown in FIG. 3, the port 10 is a TRRS port, the first switch U1 is an analog switch. The analog switch may include a pin B1, a pin VCC (power supply pin), a pin SELECT (selection pin), and a pin A. The audio acquisition module 50 may further include a resistor R1, a resistor R2, a resistor R3, a resistor R4, a capacitor C1, a capacitor C2, a capacitor C3, a capacitor C4, a capacitor C5, a capacitor C6, a capacitor C7, and a capacitor C8.

One end of the capacitor C5, the resistor R4 and the capacitor C6 in parallel is electrically connected to the pin B1, and the other end is grounded. One end of the microphone MC1 is grounded, and the other end is electrically connected to the pin B1 through the capacitor C1. A capacitor group in the first half of the foregoing circuit may filter power input into the microphone, and a capacitor group in the second half may well filter an audio signal acquired by the microphone, to reduce a signal noise. One end of the capacitor C2, the capacitor C3 and the capacitor C4 in parallel is electrically connected to the pin B1 through the resistor R3 and the capacitor C1 sequentially, and the other end is grounded. The resistor R1, the resistor R3, and the capacitor C1 are electrically connected between the pin B1 and a pin of the main control module 40. In addition, the pin B1 is connected to a 3.3 v power supply after the pin B1 is electrically connected to the capacitor C1 and the resistor R2 sequentially. The pin A is electrically connected to an R end of the TRRS port through the capacitor C7. The pin VCC is connected to 3.3 v power supply and is grounded through the capacitor C8. An L end of the TRRS port is grounded through a bidirectional TVS diode D1, and the R end is grounded through a bidirectional TVS diode D2. After the audio signal is transmitted through the capacitor C1 in the audio acquisition module 50, the main control module 40 enables the pin SELECT at the analog switch. The pin B1 is connected to the pin A. The audio signal may be input into the R end of the TRRS port through the pins B1 and the pin A sequentially, and the audio signal may be output to another device through a male connector of the TRRS port.

Figure 4:
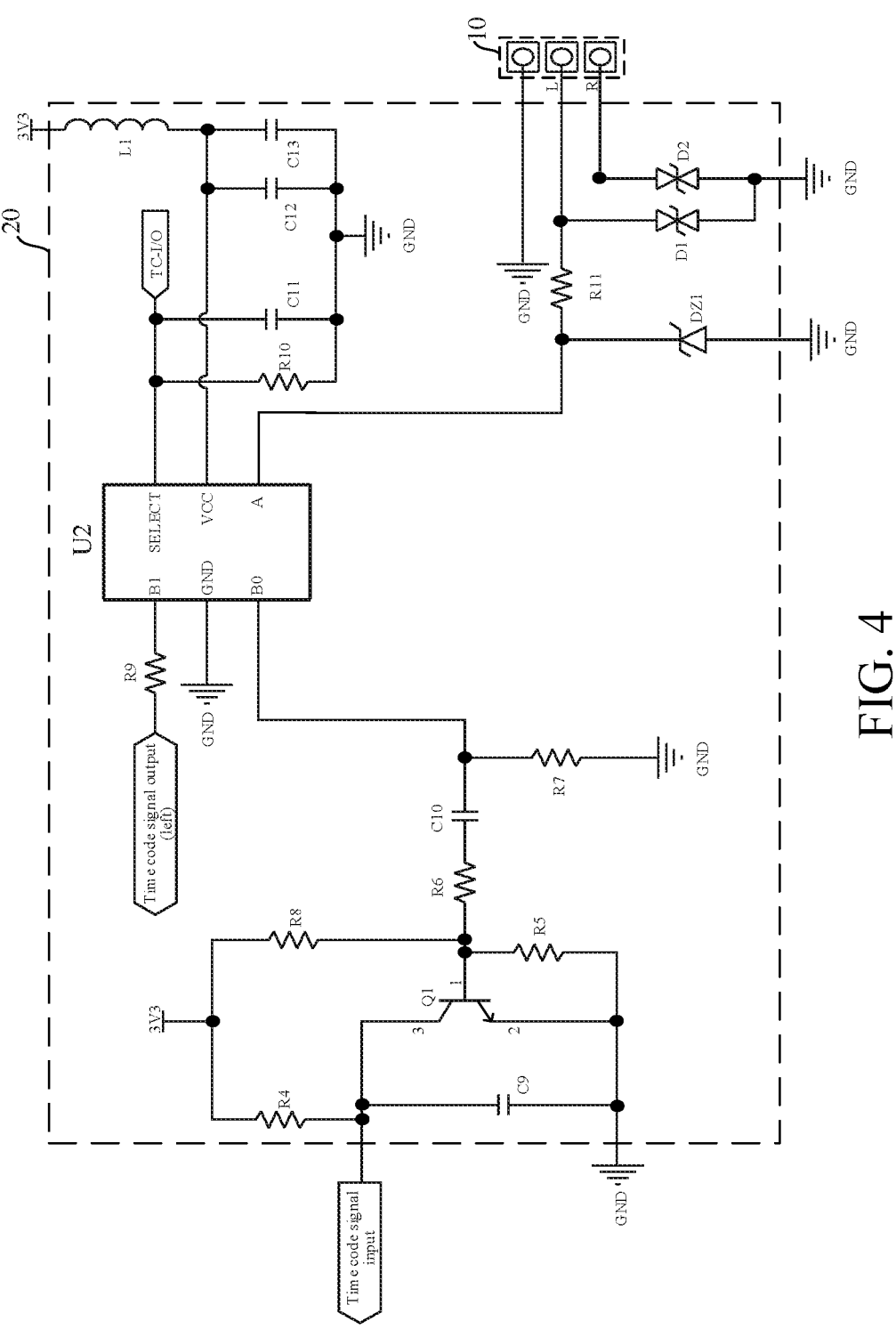
FIG. 4 is a schematic diagram of an embodiment in which a time code switching module is electrically connected to a port according to an embodiment of the present invention.

FIG. 4 is a schematic diagram of an embodiment in which a time code switching module is electrically connected to a port according to an embodiment of the present invention. As shown in FIG. 4, a second switch U2 is provided in the time code switching module 20. After amplitude adjustment is performed by the amplitude adjustment module 30 on the time code signal, the main control module 40 controls the second switch U2 to be turned on, and the time code signal undergone amplitude adjustment may be output to the port 10 through the second switch U2. The time code switching module 20 further includes a time code constant circuit. The time code constant circuit is electrically connected between the main control module 40 and the second switch U2. The time code constant circuit may receive an external time code signal from the port 10. An amplitude of the external time code signal is different from an amplitude of the time code signal undergone amplitude adjustment. After the external time code signal is transmitted through the time code constant circuit, a constant time code signal is output to main control module 40.

It may be understood that the time code constant circuit may include a R4, a R5, a R8, a C9, and a Q1. One end of the R4 and the R8 is connected to a 3.3 v supply power. The R8 and the R5 are connected to a pin 1 of the Q1. The other end of the R5 is connected to a pin 2 of the Q1. The R4 is connected to a pin 3 of the Q1. The C9 is connected between the pin 2 and the pin 3 of the Q1. The time code constant circuit may further include another peripheral circuit as shown in the figure. It can be understood that when the external time code signal is sometimes too small to be recognized, the R4, the R5, the R8, the C9, the Q1, or the like may be provided to enable the time code signal with a specific amplitude to be recognized. For example, a parameter value of the foregoing element may be set to limit identification of the amplitude of the external time code signal. For example, when the amplitude of the external time code signal is less than 0.5 v, the external time code signal cannot be transmitted from the port to the main control module 40 for recognition. When the amplitude of the external time code signal is greater than 0.5 v, such as 2.8 v, 3 v, 3.3 v, 3.5 v, or the like, 3.3 v amplitude is uniformly and stably output to the main control module 40. The external time code signal can be stably transmitted from the port into the main control module 40 for recognition. In some embodiments, the R4, the R5, the R8, the C9, and the Q1 may also reduce a risk that the external time code signal is transmitted directly into the main control module 40 through the second switch U2, causing the main control module 40 to be burned out.

In the embodiment shown in FIG. 4, the port 10 is a TRRS port. The second switch U2 may be an analog switch. The analog switch may include a pin B1, a pin B0, a pin VCC, a pin SELECT, and a pin A. The time code switching module 20 may further include a resistor R6, a resistor R7, a resistor R9, a resistor R10, a resistor R11, a capacitor C9, a capacitor C10, a capacitor C11, a capacitor C12, a capacitor C13, and an inductor L1.

The pin B1 is electrically connected to an amplitude adjustment module 30 through the resistor R9. The pin B0 is electrically connected to a base of a triode Q1 through the resistor R6 and the capacitor C10 sequentially, is connected to the 3.3 v power supply through the resistor R6, the capacitor C10, and the resistor R8 sequentially, and is grounded through the resistor R6, the capacitor C10, and the resistor R5 sequentially. A collector of the triode Q1 is electrically connected to a pin of the main control module 40. The pin is connected to the 3.3 v power supply through the resistor R4, and is grounded through the capacitor C9. An emitter of the triode Q1 is grounded. The pin A is electrically connected to the L end of the TRRS port through the resistor R11, and is electrically connected to a negative electrode of a Zener diode DZ1. A positive electrode of the Zener diode DZ1 is grounded. The pin VCC is connected to the 3.3 v power supply through the inductor L1. One end of the capacitor C12 and the capacitor C13 in parallel is electrically connected to the pin VCC and the inductor L1 separately, and the other end is grounded. The pin SELECT is electrically connected to a pin of the main control module 40. One end of the resistor R10 and the capacitor C11 in parallel is electrically connected to the pin SELECT and a pin of the main control module 40 separately, and the other end is grounded. When the external time code signal is input to the pin A of the analog switch through the L end of the TRRS port, the main control module 40 controls connection between the pin A and the pin B0. The external time code signal is transmitted through the pin A and the pin B0 sequentially and is input into the main control module 40 through the triode Q1. When a time code signal generated by the main control module 40 needs to be output to the L end of the TRRS port, the time code signal needs to be input into the amplitude adjustment module 30 for amplitude adjustment using the main control module 40. The time code signal undergone amplitude adjustment is output from the amplitude adjustment module 30 to the pin B1 of the analog switch. In this case, the main control module 40 enables the pin SELECT of the analog switch. The pin B1 is connected to the pin A. The time code signal undergone amplitude adjustment may be input to the L end of the TRRS port through the pin B1 and the pin A sequentially.

Figure 5:
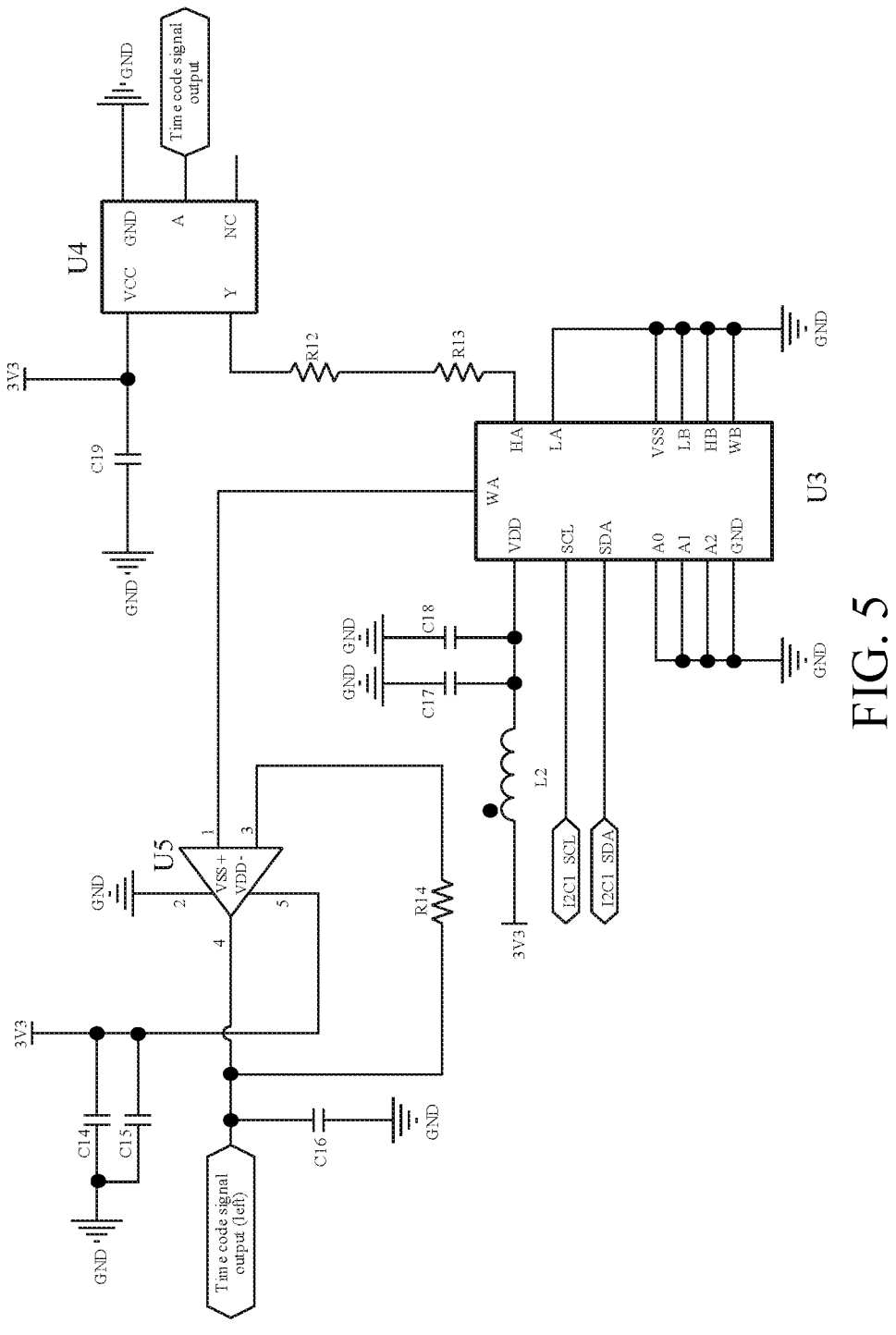
FIG. 5 is a schematic diagram of an embodiment of an amplitude adjustment module according to an embodiment of the present invention.

FIG. 5 is a schematic diagram of an embodiment of an amplitude adjustment module according to an embodiment of the present invention. As shown in FIG. 5, a potentiometer U3 is provided in the amplitude adjustment module 30. The potentiometer U3 may be electrically connected to the main control module 40 and be configured to receive a time code signal from the main control module 40 and adjust an amplitude of time code signal output. The potentiometer U3 in the present invention is preferred to but is not limited to be a digital potentiometer, or may be a wirewound potentiometer, a synthetic carbon film potentiometer, an organic solid core potentiometer, a metal glass glaze potentiometer, a conductive plastic potentiometer, or the like, which may be selected according to an actual situation and is not specified in the present embodiment.

In the embodiment shown in FIG. 5, the potentiometer U3 is a digital potentiometer. The digital potentiometer may include: a pin SCL (clock input pin), a pin SDA (data pin), a pin WA (wiper terminal of potentiometer A, tap of potentiometer A), a pin HA (high terminal of potentiometer A, high terminal of potentiometer A), a pin VDD (positive power supply pin, positive power supply pin), a pin A0, a pin A1, a pin A2, a pin VSS (negative power supply pin, negative power supply pin), a pin LB (low terminal of potentiometer B, low terminal of potentiometer B), a pin LA (low terminal of potentiometer A, low terminal of potentiometer A), a pin HB (high terminal of potentiometer B, high terminal of potentiometer B), and a pin WB (wiper terminal of potentiometer B, tap of potentiometer B). The pin SCL, the pin SDA, and the pin HA are individually electrically connected to a pin in the main control module 40 and pins are different. The pin WA is electrically connected to the time code switching module 20. The pin VDD is connected to the 3.3 v power supply through the inductor L2, and is grounded through the capacitor C17 and the capacitor C18 separately. The pin A0, the pin A1, the pin A2, the pin VSS (negative power supply pin), the pin LB (low terminal of potentiometer B), the pin LA (low terminal of potentiometer A), the pin HB, and the pin WB are all grounded. When the time code signal generated by the main control module 40 is input into the amplitude adjustment module 30, the time code signal is input into the digital potentiometer through the pin HA in the amplitude adjustment module 30. In addition, the digital potentiometer is controlled through the pin SCL and the pin SDA of the digital potentiometer to adjust the amplitude of the time code signal. The time code signal undergone amplitude adjustment is output to the time code switching module 20 through the pin WA of the digital potentiometer. In this case, the main control module 40 controls the time code switching module 20 to be turned on. The time code signal undergone amplitude adjustment may be output from the time code switching module 20 to the port 10.

In the foregoing embodiments, in addition to the potentiometer U3, the amplitude adjustment module 30 may further include a buffer U4 and a follower U5. The follower U5 is separately connected to the potentiometer U3 and the time code switching module 20 and is provided between the potentiometer U3 and the time code switching module 20. The buffer U4 is separately connected to the potentiometer U3 and the main control module 40. The time code signal generated by the main control module 40 is input into the potentiometer U3 through the buffer U4 and amplitude adjustment is performed. The time code signal undergone amplitude adjustment is input into the follower U5 and is output to the second switch U2 of the time code switching module 20 through the follower U5. In this case, the main control module 40 controls the second switch U2 to be turned on. The time code signal undergone amplitude adjustment may be output to the port 10 through the second switch U2.

Specifically, the follower U5 may be a voltage follower. The follower U5 is configured as a buffer stage and an isolation stage in the time code generation circuit, and is configured to enable the time code signal undergone amplitude adjustment to be stably input into the time code switching module 20.

In the embodiment shown in FIG. 5, the potentiometer U3 is a digital potentiometer. The buffer U4 may include a pin VCC, a pin Y, and a pin A. The follower U5 may include a pin 1, a pin 2, a pin 3, a pin 4, and a pin 5. The pin A of the buffer U4 is electrically connected to a pin of the main control module 40. The pin VCC is connected to the 3.3 v power supply. The pin VCC is grounded through the capacitor C19. The pin Y is electrically connected to the pin HA of the digital potentiometer through a resistor R12 and a resistor R13 sequentially. The pin 1 of the follower U5 is electrically connected to the pin WA of the digital potentiometer. The pin 2 is grounded. The pin 3 is electrically connected to the pin 4 through a resistor R14. The pin 4 is electrically connected to a pin of the second switch U2. The pin 4 is grounded through a capacitor C16. The pin 5 is connected to a 3.3 v power supply. A capacitor C14 and a capacitor C15 are provided between the pin 5 and the 3.3 v power supply. One end of the capacitor C14 and the capacitor C15 in parallel is grounded, and the other end is electrically connected to the pin 5 and connected to the 3.3 v power supply separately. The main control module 40 may buffer the generated time code signal through the buffer U4, to cause the pin HA of the digital potentiometer to receive a stable time code signal. After amplitude adjustment is performed on the time code signal in the digital potentiometer, the time code signal may be input into the follower U5 through the pin WA of the digital potentiometer, and be input into the second switch U2 through the pin 4 of the follower U5. In this case, the main control module 40 controls the second switch U2 to be turned on. The time code signal undergone amplitude adjustment may be output to the port 10 through the second switch U2.

Figure 6:
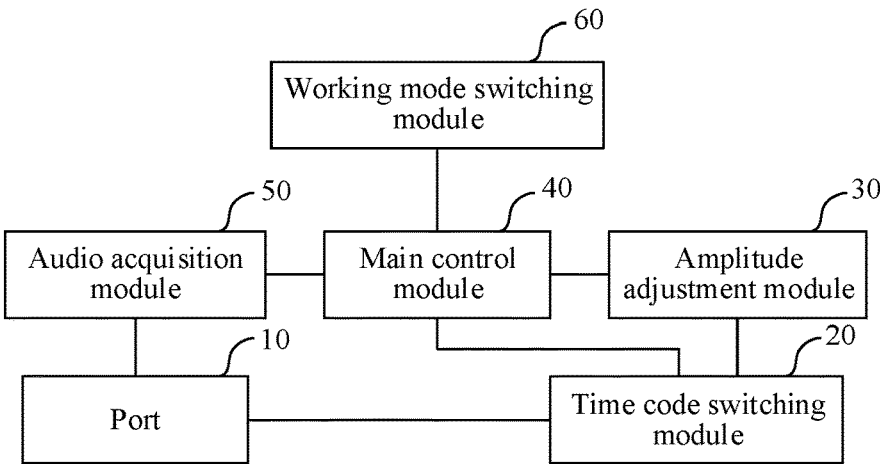
FIG. 6 is a simple schematic diagram of another embodiment of a time code generation circuit according to an embodiment of the present invention.

In another embodiment, as shown in FIG. 6, the time code generation circuit further includes a working mode switching module 60. The working mode switching module 60 is electrically connected to the main control module 40, to drive the main control module 40 to generate a control signal, so as to achieve a working mode of switching the time code generation circuit. The working mode includes: For example, the port 10 only outputs the time code signal undergone amplitude adjustment. The port 10 only outputs an audio signal. The port 10 outputs both the time code signal undergone amplitude adjustment and the audio signal. The port 10 only inputs a time code signal mode, or the like. When the time code signal is input through the port 10, the time code signal is input into the second switch U2 through the port 10, and is input from the second switch U2 into the main control module 40.

In some embodiments, an encoder U6 is provided in the working mode switching module 60. The encoder U6 is electrically connected to the main control module 40. When the working mode of the time code generation circuit needs to be switched, the main control module 40 only needs to generate a control signal through a pulse signal generated in the encoder U6, to cause the port 10 to be in a time code signal output mode, a time code signal and audio signal output mode, or a time code signal input mode.

Figure 7:
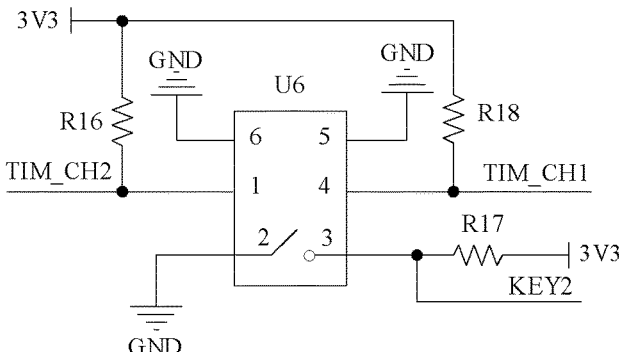
FIG. 7 is a schematic diagram of an embodiment of a working mode switching module according to an embodiment of the present invention.

FIG. 7 is a schematic diagram of an embodiment of a working mode switching module according to an embodiment of the present invention. As shown in FIG. 7, the encoder U6 includes a pin 1, a pin 2, a pin 3, and a pin 4. The pin 1, the pin 3, and the pin 4 are all connected to a pin of the main control module 40 and pins are different. The pin 2 is grounded. The pin 1 is connected to a 3.3 v power supply through a resistor R16. The pin 3 is connected to a 3.3 v power supply through a resistor R17. The pin 4 is connected to a 3.3 v power supply through a resistor R18. After the working mode of the time code generation circuit is selected on the encoder U6, a switch key on the encoder U6 is closed. A state of the pin 2 and the pin 3 of the encoder U6 is changed from off to on. The main control module 40 generates a control signal through pulse signals at the pin 1 and the pin 4, to cause the port 10 to be in a time code signal output mode, a time code signal and audio signal output mode, or a time code signal input mode.

In other embodiments of the present invention, the time code generation circuit further includes a display module. The display module is electrically connected to the main control module 40. The working mode of the time code generation circuit is displayed in the display module. The encoder U6 is operated in the display module, so that the working mode of the time code generation circuit may be switched. The display module may further include a first switching transistor and a second switching transistor. In the display module, the first switching transistor and the second switching transistor form a half-bridge drive circuit to drive operation of the display module.

Figure 8:
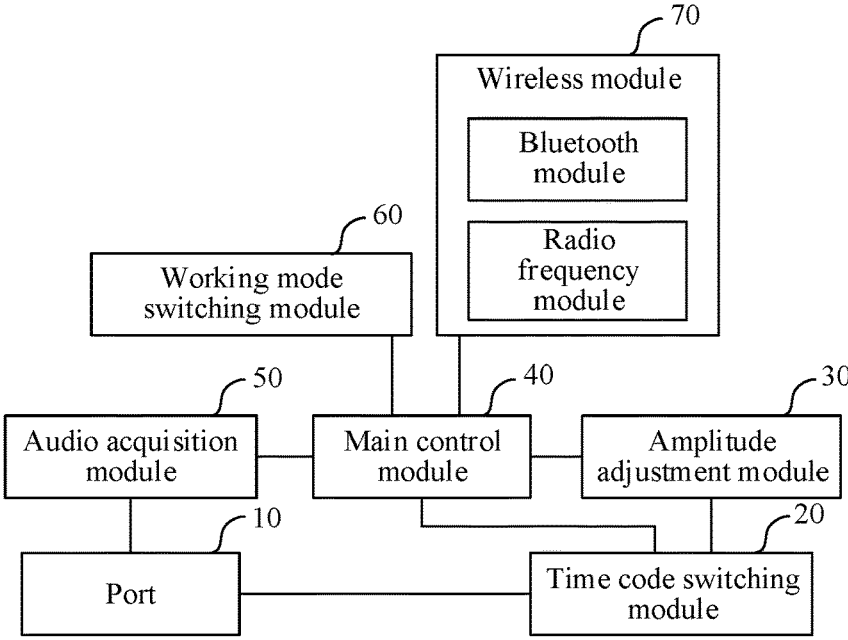
FIG. 8 is a simple schematic diagram of another embodiment of a time code generation circuit according to an embodiment of the present invention.

In some embodiments, as shown in FIG. 8, the time code generation circuit further includes a wireless module 70. The wireless module 70 is connected to the main control module 40, and is configured to transmit the time code signal to achieve synchronization of time code signals between devices where the time code generation circuit is located.

In some embodiments, the wireless module 70 may include a Bluetooth module M1 and a radio frequency module M2. The Bluetooth module M1 and the radio frequency module M2 are both electrically connected to the main control module 40. The Bluetooth module M1 and the radio frequency module M2 may both communicate with a terminal device (such as a mobile phone). The terminal devices may be provided with an application program. The application program is interactively operated by a user, to determine a primary target node and a secondary target node between devices where the time code generation circuit is located. In addition, the time code signal is transmitted or received through the radio frequency module M2, to achieve time code synchronization between devices. In some embodiments, to improve efficiency of time code synchronization and reduce a conflict or delay of time code synchronization, the Bluetooth module M1 communicates with the terminal device while the radio frequency module M2 does not communicate with the terminal device. The radio frequency module M2 is configured to communicate with a radio frequency module on another time code device.

Figure 9:
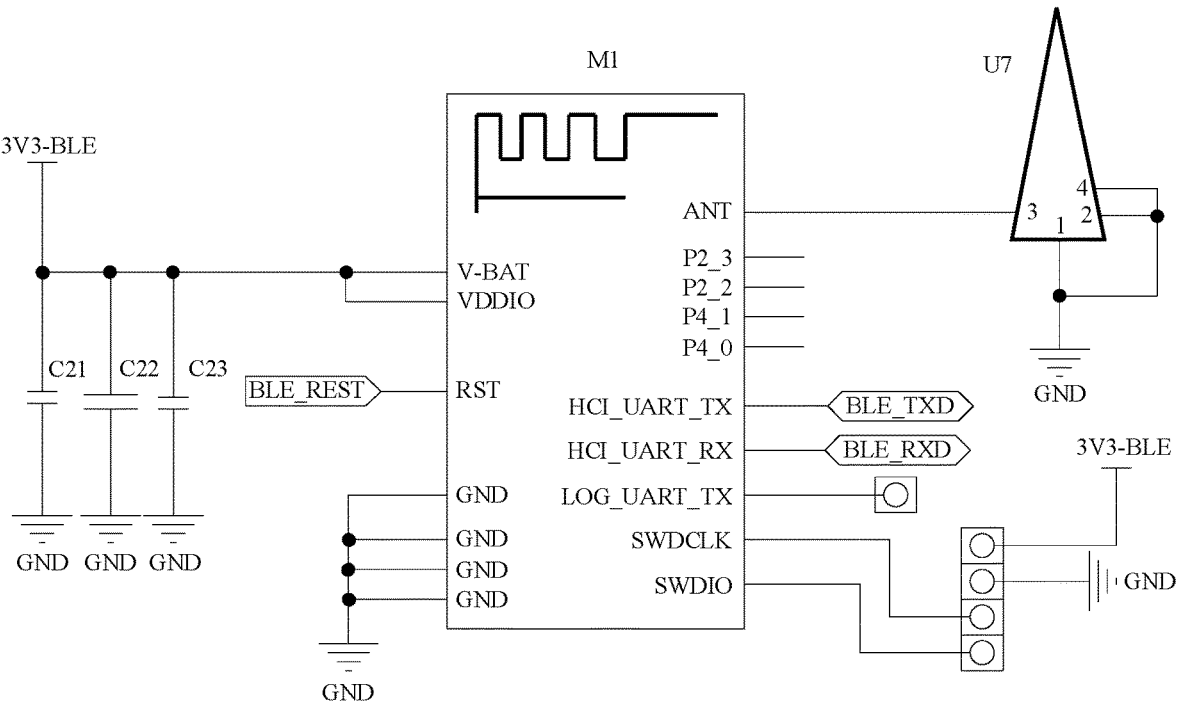
FIG. 9 is a schematic diagram of an embodiment of a Bluetooth module according to an embodiment of the present invention.

FIG. 9 is a schematic diagram of an embodiment of a Bluetooth module according to an embodiment of the present invention. In the embodiment shown in FIG. 9, the Bluetooth module M1 includes: a pin RST (reset pin), a pin HCI-UART-TX (transmitter pin), a pin HCI-UART-RX (receiver pin), a pin V-BAT (battery voltage pin), a pin VDDIO (chip IO power supply pin), and a pin ANT (antenna pin). The pin RST, the pin HCI-UART-TX, and the pin HCI-UART-RX are separately connected to a pin of the main control module 40 and pins are different. After the pin V-BAT is electrically connected to the pin VDDIO, the pin V-BAT is connected to a 3.3 v power supply. One end of a capacitor C21, a capacitor C22, and a capacitor C23 in parallel is connected to a 3.3 v power supply, and the other end is electrically connected to the pin V-BAT and the pin VDDIO separately. The pin ANT is electrically connected to the antenna U7. The pin RST of the Bluetooth module M1 is connected to the main control module 40, to reset the Bluetooth module M1 through the main control module 40. The pin HCI-UART-TX and the pin HCI-UART-RX of the Bluetooth module M1 are connected to the main control module 40, to achieve communication between the Bluetooth module M1 and the application program on the terminal device through the main control module 40.

Figure 10:
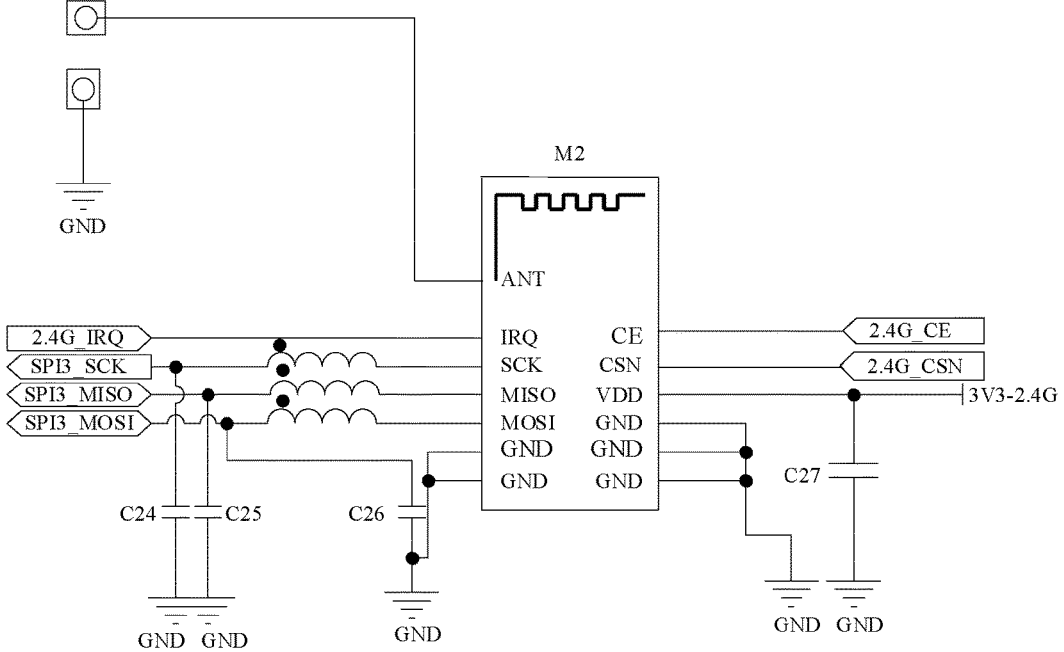
FIG. 10 is a schematic diagram of an embodiment of a radio frequency module according to an embodiment of the present invention.

FIG. 10 is a schematic diagram of an embodiment of a radio frequency module according to an embodiment of the present invention. In the embodiment shown in FIG. 10, the radio frequency module M2 includes: a pin CE (Chip Enable, chip enable), a pin CSN (chip select), a pin IRQ (Interrupt Request, interrupt request), a pin SCK (serial peripheral interface clock), a pin MISO (Master In Slave Out, master in slave out), and a pin MOSI (Master Out Slave In, master out slave in). The pin CE, the pin CSN, the pin IRQ, the pin SCK, the pin MISO, and the pin MOSI are all connected to the main control module 40. A chip select signal is transmitted through the pin CSN. The pin CE is configured to control a working mode of the radio frequency module M2. The working mode includes: a receiving mode, a sending mode, a standby mode, a power off mode, or the like. The pin IPQ is configured to interrupt output of a low level.

Figure 11:
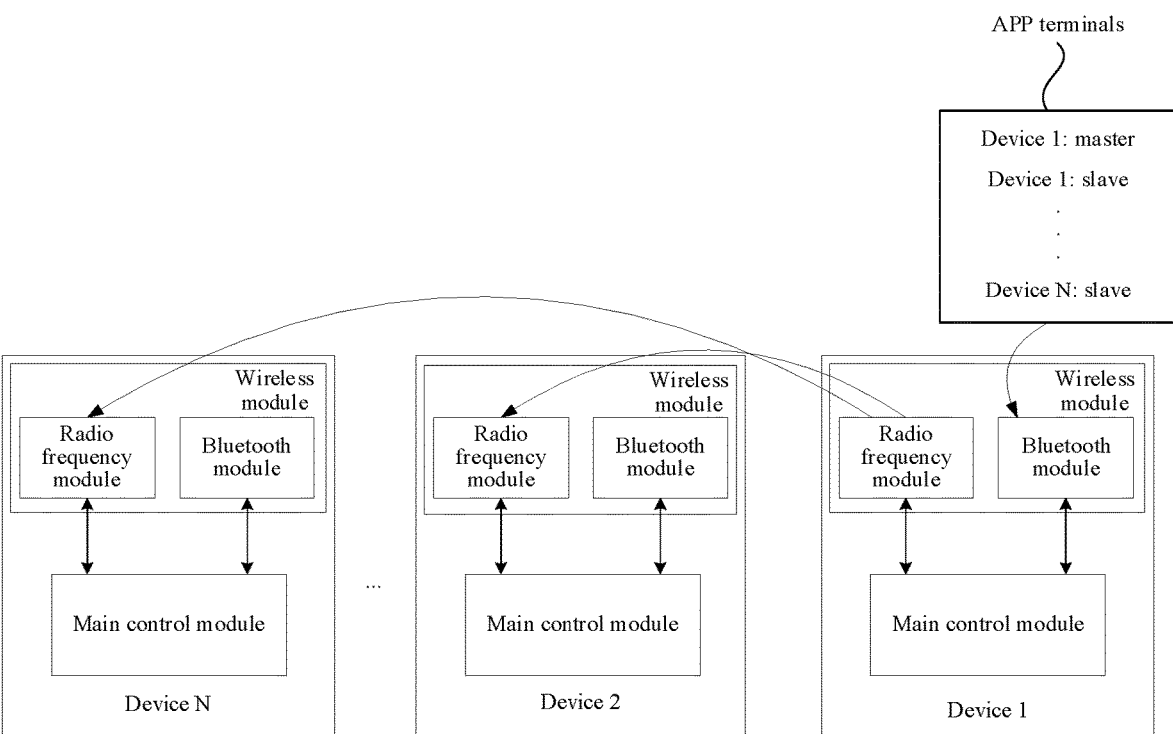
FIG. 11 is a schematic diagram of time code synchronization according to an embodiment of the present invention.

Specifically, as shown in FIG. 11, when synchronization of time code signals between a plurality of devices where the time code generation circuit is located is performed, a Bluetooth module M1 or a radio frequency module M2 in a device 1 only needs to communication with an APP on the terminal device (such as a mobile phone), to set the device 1 from a network system as a device of a target master node, and set another time coder device as a device of a target slave node. The device 1 outputs the generated time code signal to the pin MOSI of the radio frequency module M2 through the main control module 40 of the device 1. In addition, the main control module 40 of the device 1 outputs a clock signal to the pin SCK of the radio frequency module M2. In this case, the time code signal and the clock signal may be output, through the radio frequency module M2 of the device 1, to a radio frequency module M2 of a device where the target slave node is located. The radio frequency module M2 inputs, through the pin MISO of the radio frequency module M2, the received time code signal and clock signal into the main control module 40 connected to the radio frequency module M2. Synchronization of time code signals between devices is achieved by the main control module 40.

Figure 12:
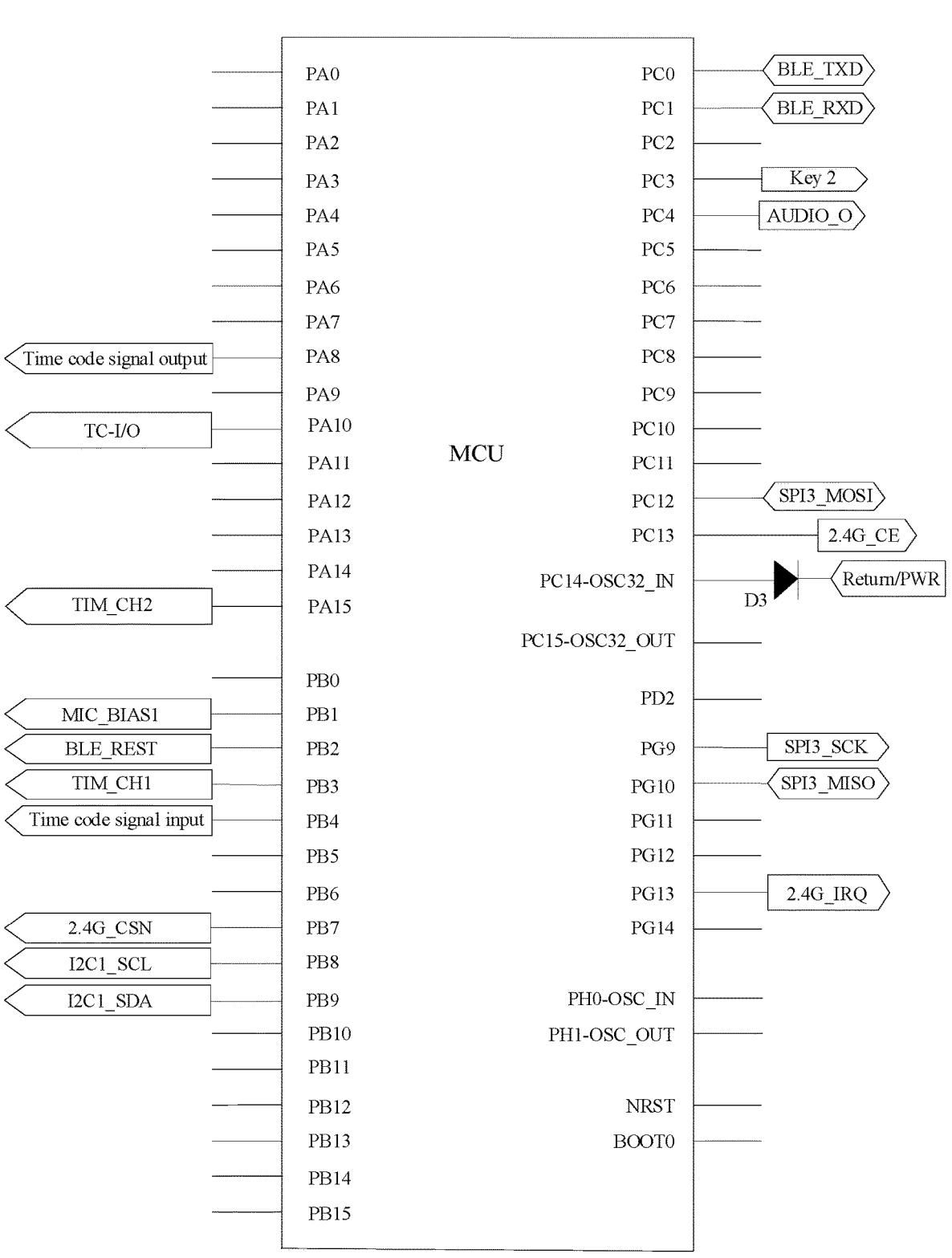
FIG. 12 is a schematic diagram of an embodiment of a main control module according to an embodiment of the present invention.

FIG. 12 is a schematic diagram of an embodiment of a main control module according to an embodiment of the present invention. As shown in FIG. 12, the main control module 40 is a single-chip microcomputer MCU. The single-chip microcomputer MCU may include a pin PA8 (Pin A8, pin A8), a pin PA15 (Pin A15, pin A15), a pin PB1 (Pin B1, pin B1), a pin PB2 (Pin B2, pin B2), a pin PB3 (Pin B3, pin B3), a pin PB4 (Pin B4, pin B4), a pin PB7 (Pin B7, pin B7), a pin PB8 (Pin B8, pin B8), a pin PB9 (Pin B9, pin B9), a pin PC0 (Pin C0, pin C0), a pin PC1 (Pin C1, pin C1), a pin PC3 (Pin C3, pin C3), a pin PC12 (Pin C12, pin C12), a pin PC13 (Pin C13, pin C13), a pin PC14-OSC32-IN (pin C14-32-bit oscillator-input), a pin PG9 (Pin G9, pin G9), a pin PG10 (Pin G10, pin G10), and a pin PG13 (Pin G13, pin G13). The pin PB1 is connected to the pin B1 of the analog switch in the audio acquisition module 50, to control the audio acquisition module 50 to output the audio signal in the port 10. The pin PB4 is connected to the pin B0 of the analog switch in the time code switching module 20, to receive a time code signal input by the time code switching module 20. The pin PA8 is connected to the pin A of the buffer U4 in the amplitude adjustment module 30, to output the time code signal to the amplitude adjustment module 30. The pin PB8 and the pin PB9 are separately connected to the pin SCL and the pin SDA of the digital potentiometer in the amplitude adjustment module 30, to control the digital potentiometer to adjust an amplitude of the time code signal input by the digital potentiometer. The pin PC3, the pin PB3, and the pin PA15 are separately connected to the pin 3, the pin 4, and the pin 1 of the encoder U6 in the working mode switching module 60, to switch the working mode of the time code generation circuit. The pin PB2 is connected to the pin RST of the Bluetooth module M1, to reset the Bluetooth module M1. The pin PC0 and the pin PC1 are separately connected to the pin HCI-UART-TX and the pin HCI-UART-RX of the Bluetooth module M1, to communicate with an application program in a device where the Bluetooth module M1 is located. The pin PG13, the pin PC13, the pin PB7, the pin PG9, the pin PG10, and the pin PC12 are separately connected to the pin IPQ, the pin CE, the pin CSN, the pin SCK, the pin MISO, and the pin MOSI of the radio frequency module M2, to transmit the time code signal and achieve time code synchronization using the application program.

In other embodiments of the present invention, the time code generation circuit may further include a charging module, a charging port, a voltage conversion module, and a power supply module. The charging module is electrically connected to the charging port, the voltage conversion module and the main control module 40 separately. The power supply module is electrically connected to the voltage conversion module, the main control module 40, the display module, the radio frequency module M2 and the Bluetooth module M1 separately.

Specifically, a terminal where a battery is located and a charging chip are provided in the charging module. The voltage conversion module may boost a voltage output by of the battery to a preset voltage (for example, 4.4 v), and separately supply power to the main control module 40, the display module, the radio frequency module M2, and the Bluetooth module M1 through the power supply module. The charging chip is electrically connected to the charging port through a socket, while the charging chip is connected to the terminal, to charge the battery in the terminal. In addition, the charging chip is electrically connected to the main control module 40, to supply power to the time code generation circuit. The charging port may be a Type-C port in a USB port.

In other embodiments of the present invention, the power supply module may further include a first power supply module, a second power supply module, and a third power supply module. The first power supply module is electrically connected to the main control module 40 and is configured to supply power to the main control module 40. The second power supply module is electrically connected to the display module and the Bluetooth module M1 and is configured to supply power to the display module and the Bluetooth module M1. The third power supply module is electrically connected to the radio frequency module M2 and is configured to supply power to the radio frequency module M2.

In other embodiments of the present invention, the time code generation circuit further includes an upgrade module. The upgrade module is configured to upgrade an interface module. The upgrade module is electrically connected to the main control module 40. The main control module 40 upgrades the interface module by controlling the upgrade module.

An embodiment of the present invention further provides a time coder. The time coder includes a housing and the time code generation circuit described in any of the foregoing embodiments.

In some embodiments of the present invention, the time code generation circuit in the time coder includes: a port 10; a time code switching module 20, wherein the time code switching module 20 is connected to the port 10; an amplitude adjustment module 30, wherein the amplitude adjustment module 30 is connected to the time code switching module 20; and a main control module 40, wherein the main control module 40 is separately connected to the time code switching module 20 and the amplitude adjustment module 30.

If the port 10 is in a time code signal output mode or a time code signal and audio signal output mode, the main control module 40 inputs a time code signal into the amplitude adjustment module 30 for amplitude adjustment. The time code signal undergone amplitude adjustment is transmitted from the time code switching module 20 into the port 10.

If the port 10 is in a time code signal input mode, the time code signal is transmitted into the time code switching module 20 through the port 10, and is transmitted from the time code switching module 20 into the main control module 40.

According to the time coder in the embodiment of the present invention, only one port 10 is provided in the circuit, a time code switching module 20 is provided between the main control module 40 and the port, and the main control module 40 controls the time code switching module 20 to be turned on, so that the external time code signal may be inputted into the main control module 40 through the port 10. In addition, an amplitude adjustment module 30 is provided between the main control module 40 and the time code switching module 20, so that the time code signal after amplitude adjustment can be outputted at the port 10. This resolves the technical problem that a time code signal outputted at the port 10 interferes with the audio signal, and greatly improves user's usage efficiency.

Figure 13:
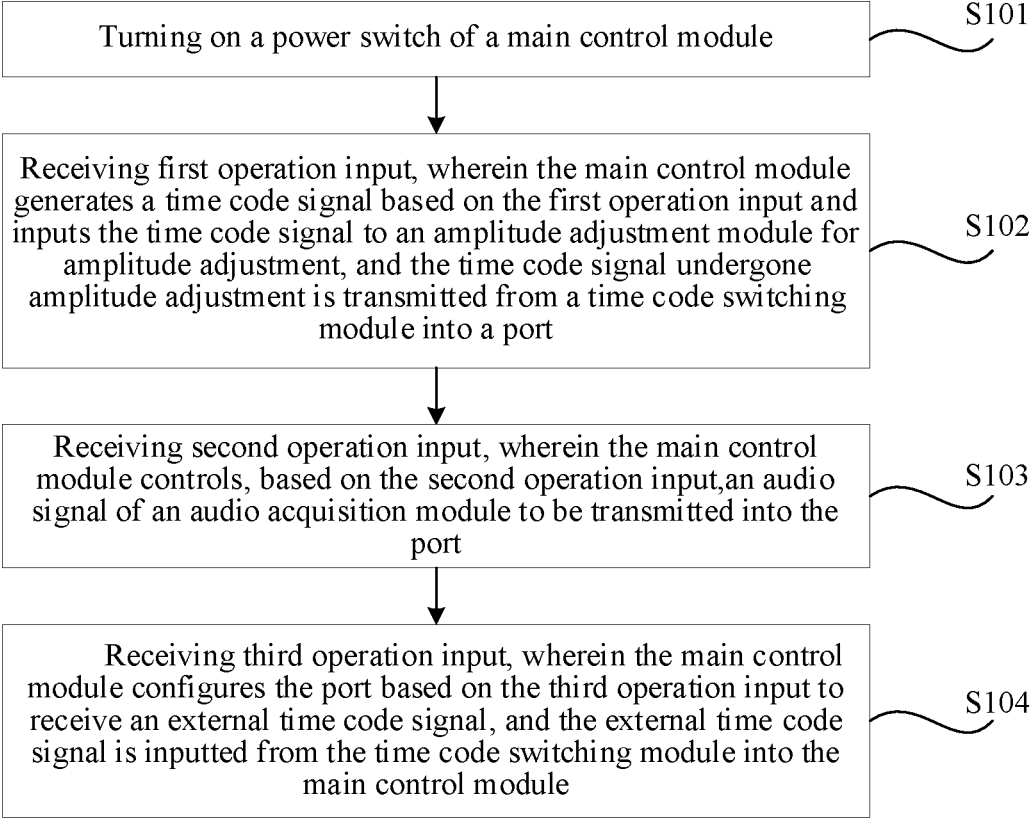
FIG. 13 is a schematic diagram of an embodiment of a signal generation method of a time coder according to an embodiment of the present invention.

To better implement the time code generation circuit in the embodiment of the present application, based on the time code generation circuit, the embodiment of the present application further provides a signal generation method of a time coder. The time coder includes the time code generation circuit described above. As shown in FIG. 13, the method includes steps 101-104.

At step 101: Turning on a power switch of a main control module 40.

At step 102: Receiving first operation input, wherein the main control module 40 generates a time code signal based on the first operation input and inputs the time code signal to an amplitude adjustment module 30 for amplitude adjustment, and the time code signal undergone amplitude adjustment is transmitted from a time code switching module 20 into a port 10.

At step 103: Receiving second operation input, wherein the main control module 40 controls, based on the second operation input, an audio signal of an audio acquisition module 50 to be transmitted into the port 10.

At step 104: Receiving third operation input, wherein the main control module 40 configures the port 10 based on the third operation input to receive an external time code signal, and the external time code signal is inputted from the time code switching module 20 into the main control module 40.

It can be understood that the first operation input, the second operation input, and the third operation input may correspond to different signal output modes. For a specific output mode, refer to the descriptions in the foregoing embodiments. Details are not described herein again. The foregoing steps are not limited in order. A user may independently choose a corresponding working mode and select a corresponding input operation.

Embodiments of the present invention provide a time code generation circuit, a time coder, and a signal generation method of the time coder. Only one port is provided in the circuit, a time code switching module is provided between a main control module and the port, and the main control module controls the time code switching module to be turned on, so that an external time code signal can be input into the main control module through the port. In addition, an amplitude adjustment module is provided between the main control module and the time switching module, so that a time code signal undergone amplitude adjustment can be output at the port.

In a specific implementation, the foregoing units or structures may be achieved as independent entities, may be any combination, or may be achieved as a same or several entities. For the specific implementation of the foregoing units or structures, refer to the foregoing method embodiments. Details are not described herein again.

The time code generation circuit, the time coder, and the signal generation method of the time coder provided in the embodiments of the present invention are described above in detail. In the present specification, specific examples are used to describe the principle and the embodiments of the present invention. The descriptions of the foregoing embodiments are merely intended to help understand the method and core ideas of the present invention. In addition, a person skilled in the art may make modifications on the specific embodiment and the application scope according to the ideas of the present invention. In conclusion, the content of the present specification should not be understood as limitation of the present invention.

What is claimed is:

1. A time code generation circuit, comprising:
a port;
a time code switching subcircuit connected to the port;
an amplitude adjustment subcircuit connected to the time code switching subcircuit; and
a controller connected to the time code switching subcircuit and the amplitude adjustment subcircuit,
wherein the controller is configured to receive a first operation input to generate a time code signal and transmit the time code signal to the amplitude adjustment subcircuit, and the amplitude adjustment subcircuit is configured to perform amplitude adjustment on the time code signal to generate an amplitude-adjusted time code signal to be transmitted to the port through the time code switching subcircuit.

2. The time code generation circuit as claimed in claim 1, further comprising:
an audio acquisition subcircuit connected to the port and the controller, and configured to acquire an audio signal,
wherein the controller is further configured to receive a second operation input to control the audio acquisition subcircuit to transmit the audio signal to the port.

3. The time code generation circuit as claimed in claim 1, wherein the controller is further configured to receive a third operation input to configure the port to receive an external time code signal to be transmitted to the controller through the time code switching subcircuit.

4. The time code generation circuit as claimed in claim 2, wherein the audio acquisition subcircuit comprises a microphone and a first switch, the microphone is connected to the controller and the first switch and configured to acquire the audio signal, and the U1 first switch is connected to the port and the controller, and
the controller is further configured to control the first switch to be turned on, to transmit the audio signal to the port.

5. The time code generation circuit as claimed in claim 1, wherein the time code switching subcircuit comprises a second switch and a time code constant circuit, the second switch is connected to the port and the amplitude adjustment subcircuit, and the time code constant circuit is electrically connected between the controller and the second switch,
the controller is further configured to control the second switch to be turned on, to configure the port to receive an external time code signal or configure the port to output the amplitude-adjusted time code signal, and an amplitude of the external time code signal is different from an amplitude of the amplitude-adjusted time code signal, and
the time code constant circuit is configured to receive the external time code signal, and output a constant time code signal to the controller.

6. The time code generation circuit as claimed in claim 1, wherein the amplitude adjustment subcircuit comprises a potentiometer connected to the time code switching subcircuit and the controller, and
the controller is further configured to control the potentiometer to adjust an amplitude of the time code signal.

7. The time code generation circuit as claimed in claim 1, wherein the amplitude adjustment subcircuit comprises a buffer connected to the time code switching subcircuit and the controller, and
the controller is further configured to control the buffer to buffer the time code signal before subjected to the amplitude adjustment.

8. The time code generation circuit as claimed in claim 1, wherein the amplitude adjustment subcircuit comprises a follower connected to the time code switching subcircuit and the controller, and
the controller is further configured to control the follower to enable the amplitude-adjusted time code signal to be stably input into the time code switching subcircuit.

9. The time code generation circuit as claimed in claim 1, wherein the port is any one of a tip-ring-ring-sleeve (TRRS) port, a Type-C port, or a universal serial bus (USB) port.

10. The time code generation circuit as claimed in claim 1, further comprising:
a working mode switching subcircuit for generating the first operation input, a second operation input, and a third operation input,
wherein the working mode switching subcircuit is connected to the controller and is configured to drive the controller to generate a control signal, to enable the port to be in a time code signal output mode, a time code signal and audio signal output mode, or a time code signal input mode.

11. The time code generation circuit as claimed in claim 10, wherein the working mode switching subcircuit comprises an encoder connected to the controller, and
the control signal is generated by the controller based on a pulse signal from the encoder.

12. A time coder, comprising:
a housing;
a port;
a time code switching subcircuit connected to the port;
an amplitude adjustment subcircuit connected to the time code switching subcircuit; and
a controller connected to the time code switching subcircuit and the amplitude adjustment subcircuit,
wherein the controller is configured to receive a first operation input to generate a time code signal and transmit the time code signal to the amplitude adjustment subcircuit, and the amplitude adjustment subcircuit is configured to perform amplitude adjustment on the time code signal to generate an amplitude-adjusted time code signal to be transmitted into to the port through the time code switching subcircuit.

13. The time coder as claimed in claim 12, further comprising:
an audio acquisition subcircuit connected to the port and the controller, and configured to acquire an audio signal,
wherein the controller is further configured to receive a second operation input to control the audio acquisition subcircuit to transmit the audio signal to the port.

14. The time coder as claimed in claim 12, wherein the controller is further configured to receive a third operation input to configure the port to receive an external time code signal to be transmitted to the controller through the time code switching subcircuit.

15. The time coder as claimed in claim 13, wherein the audio acquisition subcircuit comprises a microphone and a first switch, the microphone is connected to the controller and the first switch and configured to acquire the audio signal, and the first switch is connected to the port and the controller, and the controller is further configured to control the first switch to be turned on, to transmit the audio signal to the port.

16. The time coder as claimed in claim 12, wherein the time code switching subcircuit comprises a second switch and a time code constant circuit, the second switch is connected to the port and the amplitude adjustment subcircuit, and the time code constant circuit is electrically connected between the controller and the second switch, the controller is further configured to control the second switch to be turned on, to configure the port to receive an external time code signal or configure the port to output the amplitude-adjusted time code signal, and an amplitude of the external time code signal is different from an amplitude of the amplitude-adjusted time code signal, and the time code constant circuit is configured to receive the external time code signal, and output a constant time code signal to the controller.

17. The time coder as claimed in claim 12, wherein the amplitude adjustment subcircuit comprises:

a potentiometer connected to the time code switching subcircuit and the controller; and a buffer connected to the time code switching subcircuit and the controller, wherein the controller is further configured to: control the potentiometer to adjust an amplitude of the time code signal; and control the buffer to buffer the time code signal before subjected to the amplitude adjustment.

18. The time coder as claimed in claim 12, wherein the amplitude adjustment subcircuit comprises a follower connected to the time code switching subcircuit and the controller;

the controller is further configured to control the follower to enable the amplitude-adjusted time code signal to be stably input into the time code switching subcircuit; and the port is any one of a TRRS port, a Type-C port, or a USB port.

19. The time coder as claimed in claim 12, further comprising:

a working mode switching subcircuit for generating the first operation input, a second operation input, and a third operation input, wherein the working mode switching subcircuit is connected to the controller and is configured to drive the controller to generate a control signal, to enable the port to be in a time code signal output mode, a time code signal and audio signal output mode, or a time code signal input mode; and the working mode switching subcircuit comprises an encoder connected to the controller, and the control signal is generated by the controller based on a pulse signal from the encoder.

20. A signal generation method by a time coder, wherein the time coder comprises:

a port;

a time code switching subcircuit connected to the port;

an amplitude adjustment subcircuit connected to the time code switching subcircuit; and a controller connected to the time code switching subcircuit and the amplitude adjustment subcircuit, wherein the controller is configured to receive a first operation input to generate a time code signal and transmit the time code signal to the amplitude adjustment subcircuit, and the amplitude adjustment subcircuit is configured to perform amplitude adjustment on the time code signal to generate an amplitude-adjusted time code signal to be transmitted to the port through the time code switching subcircuit, the signal generation method comprising:

turning on a power switch of the controller;

in response to receiving the first operation input, the controller generating the time code signal based on the first operation input and transmitting the time code signal to the amplitude adjustment subcircuit, so that the amplitude adjustment subcircuit performs the amplitude adjustment on the time code signal to generate the amplitude-adjusted time code signal and transmits the amplitude-adjusted time code signal to the port through the time code switching subcircuit;

in response to receiving a second operation input, the controller controlling an audio acquisition subcircuit to transmit an audio signal, acquired by the audio acquisition subcircuit, to the port based on the second operation input; and in response to receiving a third operation input, the controller configuring the port based on the third operation input to receive an external time code signal and transmit the external time code signal to the controller through the time code switching subcircuit.

\* \* \* \* \*